US012718390B2

(12) United States Patent
Lin et al.

(10) Patent No.: US 12,718,390 B2
(45) Date of Patent: Aug. 25, 2026

(54) ADAPTIVE FRAME RATE FOR LOW POWER SLAM IN XR

(71) Applicant: MEDIATEK INC., Hsinchu (TW)

(72) Inventors: Chun Chen Lin, Hsinchu (TW); Tung-Chien Chen, Hsinchu (TW); Chia-Da Lee, Hsinchu (TW); Yang-Tzu Liu Tsen, Hsinchu (TW); Jia-Ren Chang, Hsinchu (TW); Deep Yap, Singapore (SG); Wai Mun Wong, Singapore (SG); Yi Cheng Lu, Hsinchu (TW); Chia-Ming Cheng, Hsinchu (TW)

(73) Assignee: MEDIATEK INC., Hsinchu City (TW)

( * ) Notice: Subject to any disclaimer, the term of this patent is extended or adjusted under 35 U.S.C. 154(b) by 256 days.

(21) Appl. No.: 18/433,194

(22) Filed: Feb. 5, 2024

(65) Prior Publication Data

US 2024/0273745 A1 Aug. 15, 2024

Related U.S. Application Data

(60) Provisional application No. 63/484,206, filed on Feb. 10, 2023.

(51) Int. Cl.
*G06V 10/00* (2022.01)
*G06T 7/00* (2017.01)
(Continued)

(52) U.S. Cl.
CPC ............ *G06T 7/579* (2017.01); *G06T 7/0002* (2013.01); *G06T 7/20* (2013.01); *G06T 7/40* (2013.01);
(Continued)

(58) Field of Classification Search
CPC ......... G06T 7/579; G06T 7/0002; G06T 7/20; G06T 7/40; G06T 2207/30168;
(Continued)

(56) References Cited

U.S. PATENT DOCUMENTS 9,759,918 B2 * 9/2017 Ebstyne .................... G06T 7/85
9,826,217 B2 * 11/2017 Zhang .................... G03B 35/10
(Continued)

FOREIGN PATENT DOCUMENTS

CN 115525055 A 12/2022
TW 202012880 A 4/2020
WO 2022/201785 A1 9/2022

OTHER PUBLICATIONS

Kim et al., "EP 3896655 A1 Augmented reality (AR) device and method of predicting pose therein"; date published Oct. 20, 2021.*
(Continued)

*Primary Examiner* — Amir Alavi
(74) *Attorney, Agent, or Firm* — Winston Hsu

(57) ABSTRACT

A method for performing frame rate adaptation in a simultaneous localization and mapping (SLAM) device is provided. The SLAM device includes a SLAM processor. The method includes: acquiring data from the SLAM device; determining, based on the acquired data, an operative condition of the SLAM device; deciding, based on the determined operative condition, a target frame rate for the SLAM device; and controlling, based on the decided target frame rate, a frame rate of an image sequence inputted into the SLAM processor.

20 Claims, 12 Drawing Sheets

(51) Int. Cl.
*G06T 7/20* (2017.01)
*G06T 7/40* (2017.01)
*G06T 7/579* (2017.01)

(52) U.S. Cl.
CPC ............... *G06T 2207/30168* (2013.01); *G06T 2207/30242* (2013.01)

(58) Field of Classification Search
CPC .......... G06T 2207/30242; H04N 23/60; G02B 27/0093; G02B 27/01; G06F 3/346
See application file for complete search history.

(56) References Cited

U.S. PATENT DOCUMENTS

| | | | | |
|---|---|---|---|---|
| 10,628,950 | B2 * | 4/2020 | Price | G01S 17/86 |
| 10,684,469 | B2 | 6/2020 | Smith | |
| 11,112,611 | B1 * | 9/2021 | Kessler | G02B 27/286 |
| 11,624,928 | B2 * | 4/2023 | Freeman | G02B 27/0172 345/8 |
| 12,235,446 | B2 * | 2/2025 | Freeman | G02B 27/0172 |
| 12,444,078 | B2 * | 10/2025 | Takemoto | H04N 13/239 |
| 2014/0316636 | A1 * | 10/2014 | Hong | G05D 1/0044 901/1 |
| 2021/0385379 | A1 | 12/2021 | Smith | |
| 2022/0036082 | A1 * | 2/2022 | Varadarajan | G06T 7/246 |
| 2024/0169580 | A1 | 5/2024 | Eshima | |

OTHER PUBLICATIONS

Yinlong Zhang et al., "Robust orientation estimate via inertial guided visual sample consensus", Personal and Ubiquitous Computing, Springer Verlag, London GB, vol. 22, No. 2, Aug. 1, 2017, XP058401676, pp. 259-274. ,Aug. 1, 2017.

Silveira G. et al., "An Efficient Direct Approach to Visual SLAM", IEEE Transactions on Robotics, vol. 24, No. 5, Oct. 1, 2008, XP011332771, pp. 969-979. ,Oct. 1, 2008.

* cited by examiner

ADAPTIVE FRAME RATE FOR LOW POWER SLAM IN XR

CROSS REFERENCE TO RELATED APPLICATIONS

The present application claims priority to U.S. Provisional Application No. 63/484,206, filed on Feb. 10, 2023, which is incorporated herein by reference in its entirety.

TECHNICAL FIELD

The present disclosure relates generally to extended reality (XR). In particular, the disclosure relates to enhanced simultaneous localization and mapping (SLAM) used in XR tracking.

BACKGROUND

Simultaneous localization and mapping (SLAM) is a fundamental element in the operation of an extended reality (XR) apparatus, such as augmented reality (AR) and virtual reality (VR) systems. By continuously analyzing data from various sensors (for example, cameras, gyroscopes, accelerometers, etc.), a SLAM device enables the XR apparatus to determine its precise location in the physical environment in real time. As the XR apparatus moves, the SLAM device can dynamically establish and update a comprehensive map of the surrounding environment. By this way, the SLAM device can track the movements of the XR apparatus and the user wearing the XR apparatus within the mapped environment.

It is desirable to improve the performance of SLAM devices to help achieve more attractive XR experiences.

SUMMARY

Aspects of the disclosure provide a method for performing frame rate adaptation in a simultaneous localization and mapping (SLAM) device. The SLAM device includes a SLAM processor. The method includes: acquiring data from the SLAM device; determining, based on the acquired data, an operative condition of the SLAM device; deciding, based on the determined operative condition, a target frame rate for the SLAM device; and controlling, based on the decided target frame rate, a frame rate of an image sequence inputted into the SLAM processor.

Aspects of the disclosure provide an apparatus for performing frame rate adaptation in a SLAM device. The SLAM device includes a SLAM processor. The apparatus includes processing circuitry configured to: acquire data from the SLAM device; determine, based on the acquired data, an operative condition with respect to the SLAM device; decide, based on the determined operative condition, a target frame rate for the SLAM device; and control, based on the decided target frame rate, a frame rate of an image sequence inputted into the SLAM processor.

Aspects of the disclosure also provide a non-transitory computer-readable medium storing instructions. The instructions, when executed by a processor, can cause the processor to perform the above method for performing frame rate adaptation in a SLAM device.

Note that this summary section does not specify every embodiment and/or incrementally novel aspect of the present disclosure or claimed invention. Instead, the summary only provides a preliminary discussion of different embodiments and corresponding points of novelty. For additional details and/or possible perspectives of the invention and embodiments, the reader is directed to the Detailed Description section and corresponding figures of the present disclosure as further discussed below.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

The following disclosure provides different embodiments, or examples, for implementing various features of the provided subject matter. Specific examples of components and arrangements are described below to simplify the present disclosure. These are, of course, merely examples and are not intended to be limiting.

For example, the order of discussion of the steps as described herein has been presented for the sake of clarity. In general, these steps can be performed in any suitable order. Additionally, although each of the different features, techniques, and configurations, etc., herein may be discussed in different places of this disclosure, it is intended that each of the concepts can be executed independently of each other or in combination with each other. Accordingly, the present disclosure can be embodied and viewed in many different ways.

Furthermore, as used herein, the words "a," "an," and the like generally carry a meaning of "one or more," unless stated otherwise.

To enhance the user experience with an extended reality (XR) apparatus, certain key requirements need to be met. Swift and precise tracking is essential to suppress potential motion sickness during XR interactions. Therefore, one crucial consideration is to maintain low-latency and high-accuracy tracking across essential components, including the user's head, hands, controllers, and eye movements.

Figure 1:
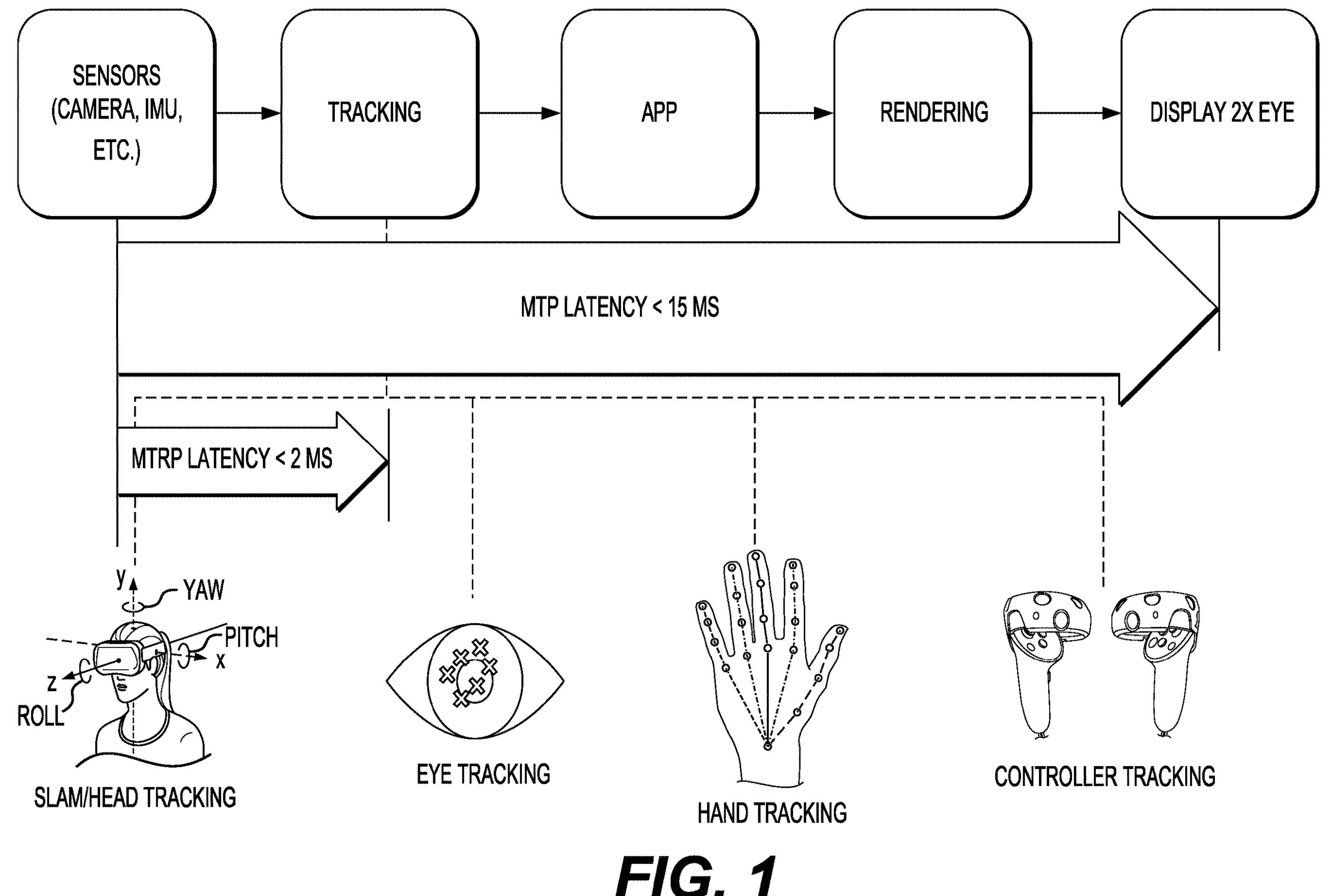
FIG. 1 illustrates typical requirements for a simultaneous localization and mapping (SLAM) device deployed in an extended reality (XR) apparatus, in accordance with embodiments of the disclosure.

FIG. 1 illustrates the typical latency parameter requirements for a simultaneous localization and mapping (SLAM) device deployed in an XR apparatus, in accordance with embodiments of the disclosure. Specifically, the Motion-To-Realtime-Pose (MTRP) latency represents the duration for the SLAM device to detect a movement and accordingly update the virtual representation, including position and orientation. Furthermore, the Motion-To-Photon (MTP) latency represents the time from when the user makes a movement to the moment they perceive the corresponding change in the displayed content, i.e., the time taken for a movement to be translated into the final photons reaching the user's eyes.

Ideally, the MTRP latency should be less than 2 ms. Additionally, maintaining an MTP latency of less than 15 ms is desirable to ensure that the XR environment responds promptly to user actions. Moreover, for XR systems equipped with pose-prediction capabilities, the MTP latency can be further reduced to 0 ms, indicating virtually instantaneous translation of user movements into the XR environment.

When users engage in prolonged XR experiences, minimizing power consumption becomes important. This is particularly crucial for fanless XR systems, aiming for a sustained playtime of no less than three hours, for example. High energy efficiency not only enhances the overall user experience, but also facilitates uninterrupted XR engagement, allowing users to immerse themselves into XR content for extended durations without the inconvenience of frequent recharging.

Additionally, achieving outstanding display quality is important to alleviate the screen-door visual effect, thereby ensuring a seamless and immersive XR environment. Meeting these requirements can optimize performance and foster user comfort within XR systems, but requires to maintain a balance among competing factors.

Figure 2A:
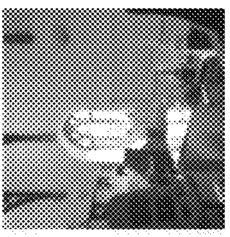
FIG. 2A shows exemplary image sequences captured by a camera sensor at two different image frequencies (30 frames-per-second (fps) and 10 fps), in accordance with embodiments of the disclosure.
Figure 2A:
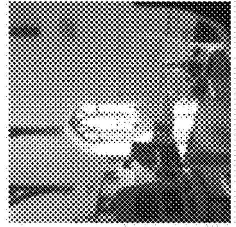
Figure 2A:
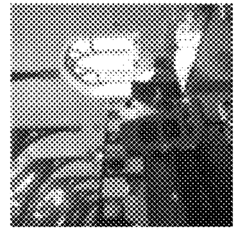
Figure 2A:
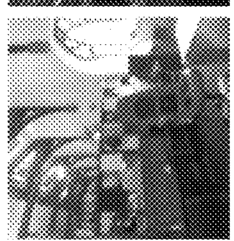
Figure 2A:
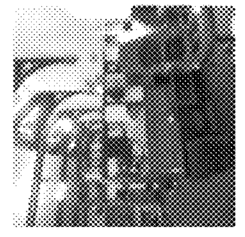
Figure 2A:
Figure 2A:
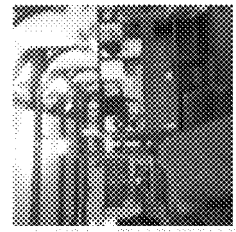
Figure 2A:
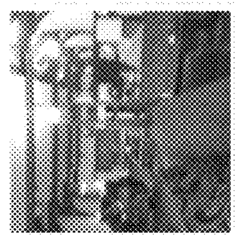
Figure 2A:
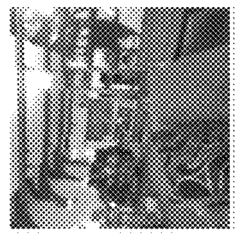
Figure 2A:
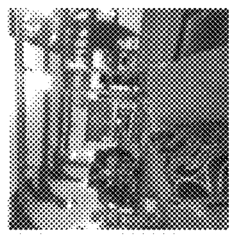
Figure 2A:
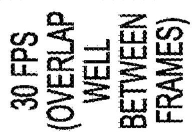

FIG. 2A shows image sequences captured by a camera sensor operating at two different image frequencies, 30 frames per second (fps) and 10 fps. At 30 fps, there is a significant overlap between consecutive frames. In contrast, the images captured at 10 fps exhibits a noticeable reduction in the overlap between frames. Higher frame rates can ensure a smoother and more detailed representation of the scene, contributing to increased accuracy for the SLAM device.

Figure 2B:
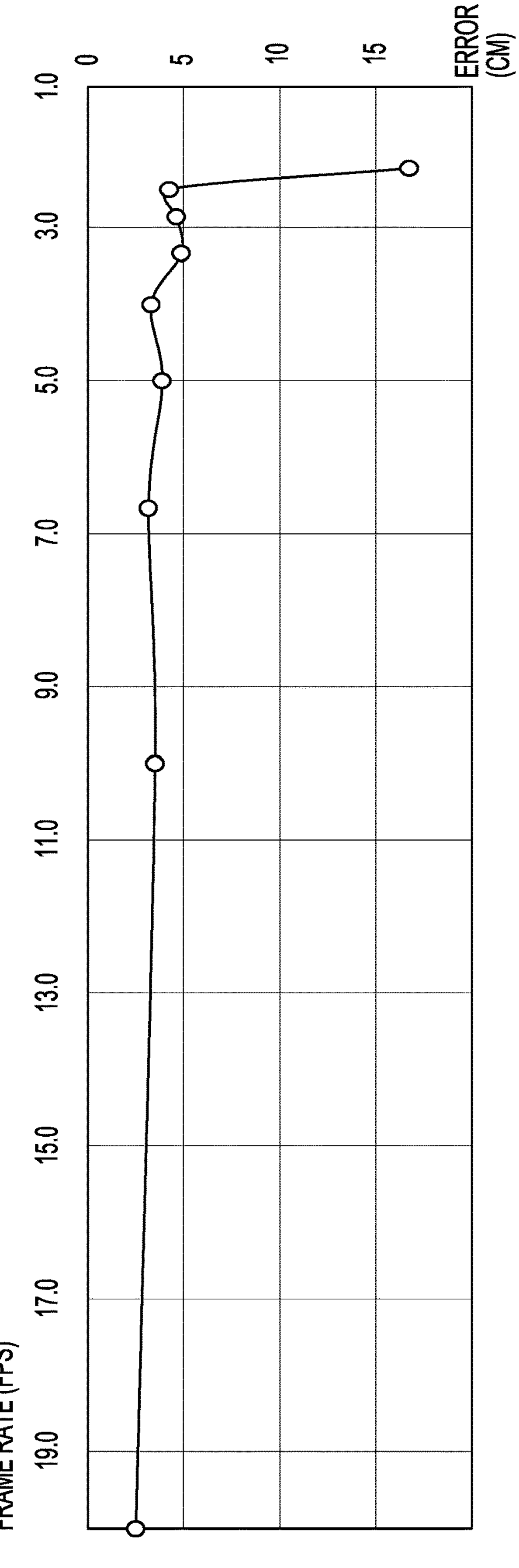
FIG. 2B shows a graph depicting the relationship between frame rate and accuracy of a SLAM device, in accordance with embodiments of the disclosure.

However, when circumstances permit, a lower frame rate introduces a trade-off between accuracy and resource efficiency. FIG. 2B shows a graph depicting the relationship between frame rate and accuracy of a SLAM device, in accordance with embodiments of the disclosure. The data depicted in FIG. 2B, corresponding to the usage scenario illustrated in FIG. 2A, reveals a robust consistency in the translation error of the SLAM device. As can be seen from FIG. 2B, the SLAM device consistently maintains a translation error within a specified standard across a broad range of frame rates.

In summary, both accuracy and power efficiency are crucial considerations for the SLAM device. While reducing the frame rate can contribute to decreased power consumption, it may also result in reduced accuracy. For general operative conditions, maintaining a normal or standard frame rate is advisable to ensure good accuracy. However, in certain usage scenarios involving, e.g., relatively slower motion or scenes with rich textures, adopting a lower frame rate can effectively reduce power consumption without compromising accuracy.

Figure 3:
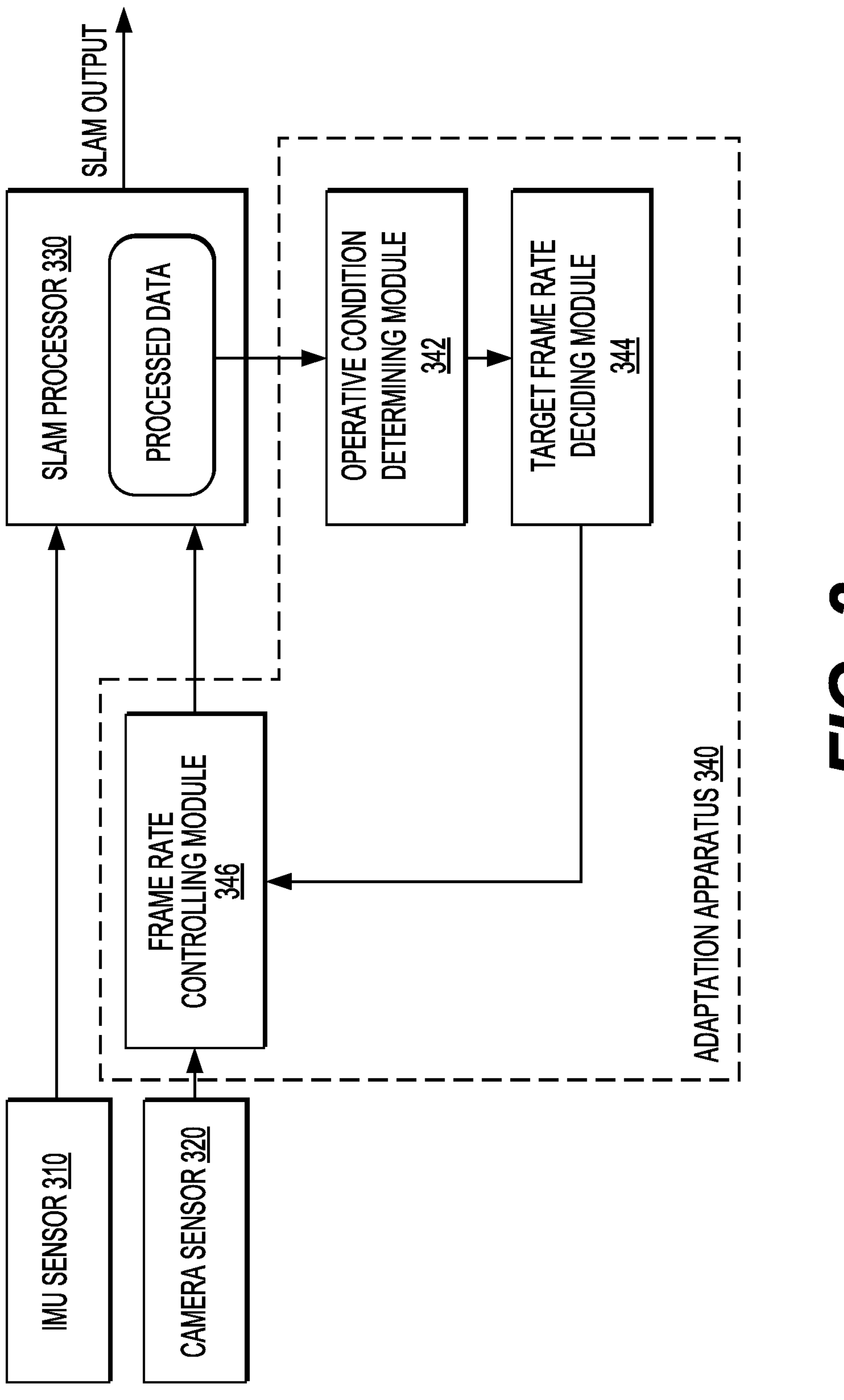
FIG. 3 shows a block diagram of an exemplary adaptation apparatus for performing frame rate adaptation in a SLAM device, in accordance with one embodiment of the disclosure.

FIG. 3 shows a block diagram of an exemplary adaptation apparatus 340 for performing frame rate adaptation in a SLAM device, in accordance with one embodiment of the disclosure. The SLAM device includes an Inertial Measurement Unit (IMU) sensor 310, a camera sensor 320, and a SLAM processor 330. The IMU sensor 310 measures accelerations and angular velocities using three-axis accelerometer and three-axis gyroscope, for example, to estimate the position and orientation of the SLAM device. Simultaneously, the camera sensor 320 captures an image sequence of the surrounding environment, using either a single camera or multiple cameras. The SLAM processor 330 acquires data sensed by the IMU sensor 310 and the camera sensor 320, and processes the acquired data to generate a SLAM output. Typically, the SLAM output can include a detailed map of the environment and information about the current estimated position and orientation of the SLAM device within that map.

The adaptation apparatus 340 can be integrated within the SLAM device, or arranged outside of the SLAM device. The adaptation apparatus 340 includes an operative condition determining module 342, a target frame rate deciding module 344, and a frame rate controlling module 346.

The operative condition determining module 342 acquires the data processed inside the SLAM processor 330, and evaluates the operation state or condition of the SLAM device, based on the acquired data.

Based on the operative condition received from the operative condition determining module 342, the target frame rate deciding module 344 decides a target frame rate for the SLAM device.

The frame rate controlling module 346 can be coupled between the camera sensor 320 and the SLAM processor 330. Based on the target frame rate received from the target frame rate deciding module 344, the frame rate controlling module 346 regulates the frame rate of the image sequence transmitted from the camera sensor 320 to the SLAM processor 330.

For example, under certain operative conditions, the target frame rate can be set at a value lower than the standard frame rate used during normal operations. By means of this dynamic frame rate adaptation mechanism, it is possible to achieve a balance between maintaining accuracy and optimizing the energy efficiency of the SLAM device.

Figure 4A:
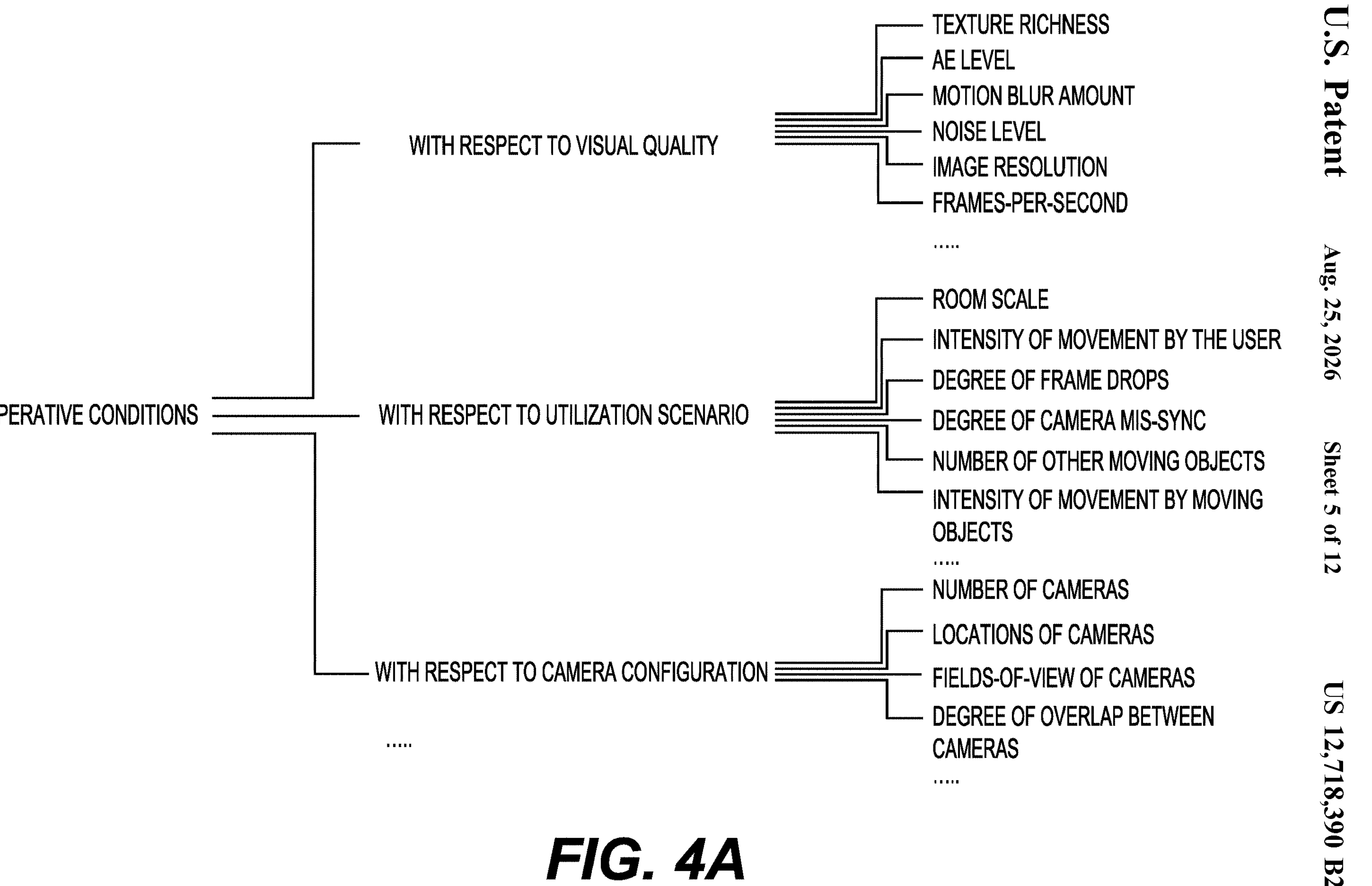
FIGS. 4A, 4B, 4C, and 4D illustrate different operative conditions of a SLAM device, in accordance with embodiments of the disclosure.

FIG. 4A shows exemplary operative conditions of the SLAM device, in accordance with embodiments of the disclosure.

For example, the operative conditions can involve the visual quality of the image sequence captured by the camera sensor. This can include aspects such as the richness of texture in the image sequence, the level of auto exposure (AE) in the image sequence, the amount of motion blur in the image sequence, the level of noise in the image sequence, resolution of the image sequence, and a frames-per-second of the image sequence, etc.

As another example, the operative conditions can be with respect to the utilization scenario of the SLAM device. This can include one or more factors such as the scale of the room where the SLAM device is used, the intensity of movement by the user wearing the SLAM device, the degree of frame drops in the SLAM device, the degree of camera mis-sync of the camera sensor, the number of other moving objects in the room, and the intensity of movement exhibited by these moving objects, etc.

Additionally, the operative conditions can be associated with the camera configuration of the camera sensor. This can include one of more of the number of cameras included in the camera sensor, locations of the cameras, fields-of-view of the cameras, and the degree of overlap between the cameras, etc.

Note that the operative conditions enumerated in FIG. 4A are illustrative and not exhaustive. It is possible to use other specific operative conditions without deviating from the scope or spirit of the disclosure.

Figure 4C:
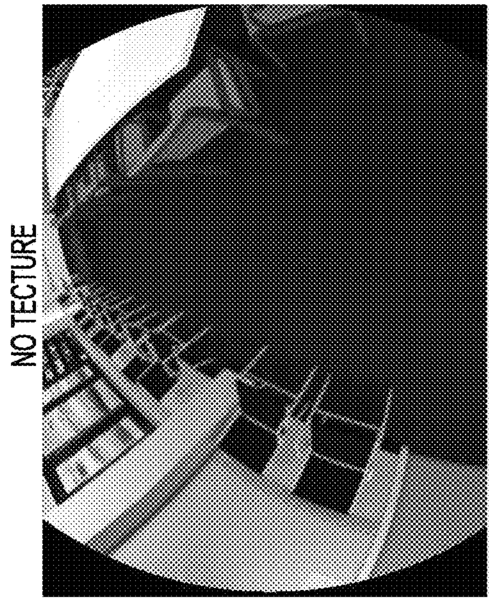
Figure 4D:
Figure 4B:

FIGS. 4B, 4C, and 4D show three exemplary operative conditions of the SLAM device, i.e., with numerous moving objects (represented by the rolling footballs in the scene), poor texture richness (absence of texture on the floor), and significant variation in the AE level. In scenarios where lots of moving object exist in the surrounding environment, the scene exhibits poor texture richness, or there is high AE variation, the target frame rate deciding module 344 can determine to use a higher target frame rate. For example, adopting the standard frame rate (e.g., 30 fps) used during normal operations can ensure the accuracy of the SLAM device under these specific operative conditions.

Figure 5:
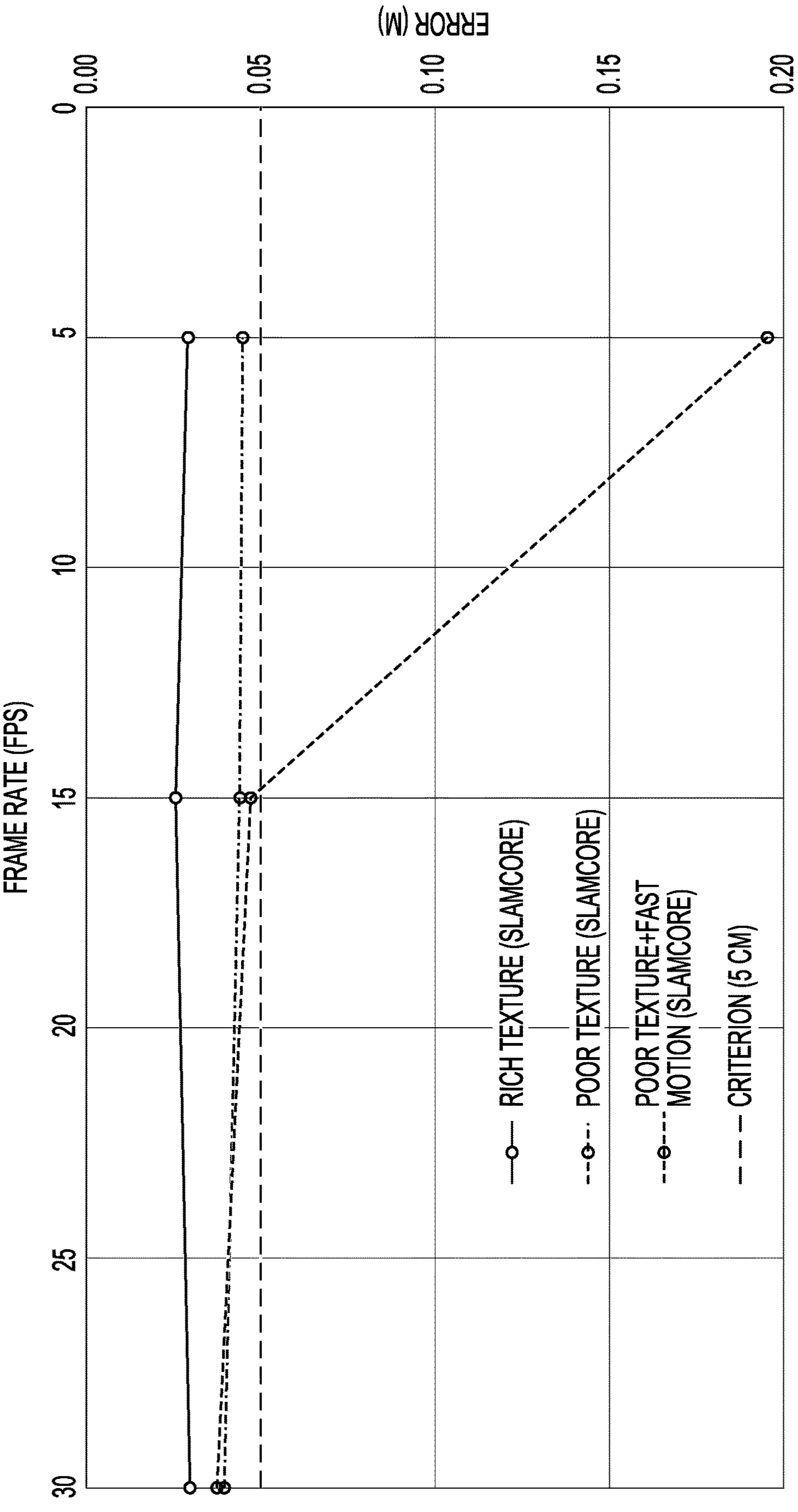
FIG. 5 shows a graph depicting the relationship between frame rate and accuracy of a SLAM device under three different operative conditions (rich texture, poor texture, and poor texture combined with fast motion), in accordance with embodiments of the disclosure.

FIG. 5 shows a graph depicting the relationship between frame rate and accuracy of a SLAM device under three different operative conditions, (1) rich texture, (2) poor texture, and (3) poor texture combined with fast motion, as tested with the SLAMCORE platform. As can be seen from FIG. 5, a standard frame rate of 30 fps is not necessary for each of these operative conditions. For the usage scenario (3), a low-power mode operating at 15 fps can be sufficient to meet the accuracy requirements, e.g., 5 cm, 3 degrees. For the usage scenarios (1) and (2), it is also possible to adaptively reduce the frame rate to 10 fps or even 5 fps while preserving accuracy.

Figure 6:
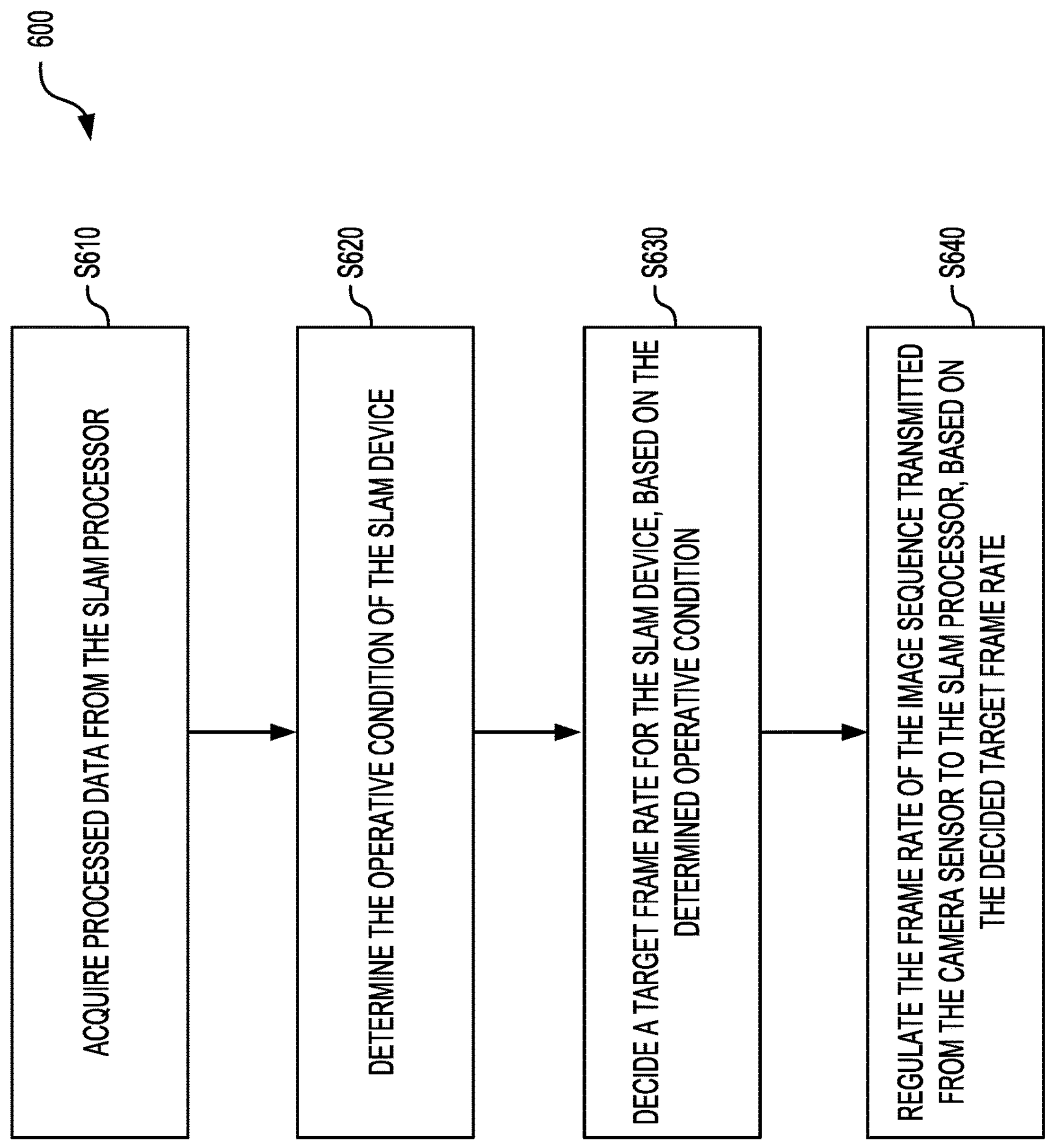
FIG. 6 shows a flow chart of an exemplary procedure for performing frame rate adaptation in a SLAM device, in accordance with one embodiment of the disclosure.

FIG. 6 shows a flow chart of an exemplary procedure 600 for performing frame rate adaptation in a SLAM device, in accordance with embodiments of the disclosure. In step S610, processed data within the SLAM processor is acquired. Subsequently, in step S620, the target frame rate of the SLAM device is determined based on the acquired data. Although FIG. 3 shows that the processed data within the SLAM processor is directly used as the acquired data, one skilled in the art can recognize that an analysis of the data acquired from the SLAM processor can be performed for the determination of the target frame rate.

In step S630, a target frame rate for the SLAM device is decided based on the determined operative condition. In step S640, frame rate adaptation is performed based on the decided target frame rate. Specifically, the frame rate of the image sequence transmitted from the camera sensor 320 to the SLAM processor 330 can be regulated to be the target frame rate.

Figure 7:
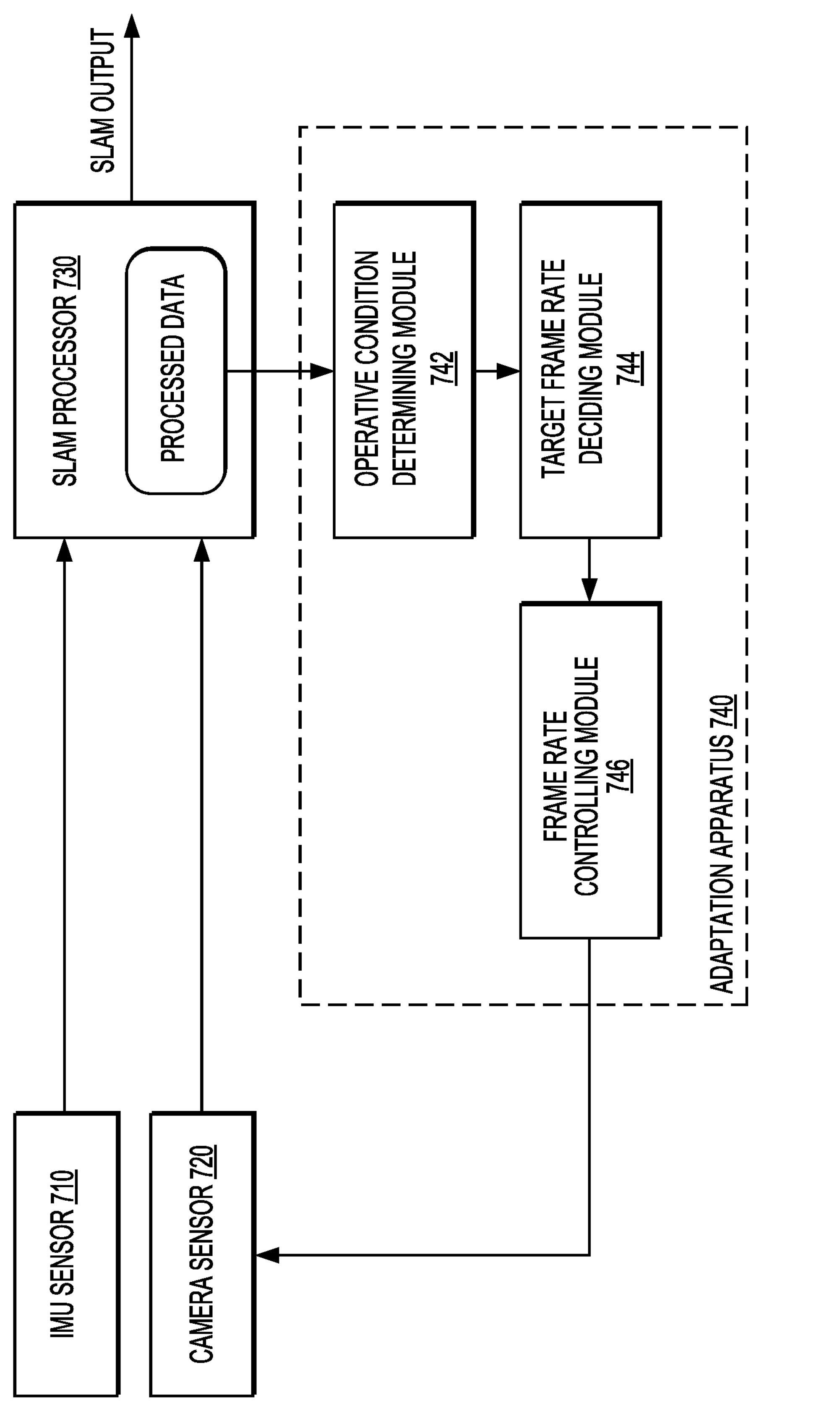
FIG. 7 shows a block diagram of an exemplary adaptation apparatus for performing frame rate adaptation in a SLAM device, in accordance with one embodiment of the disclosure.

Note that the deployment of FIGS. 3 and 6 is merely illustrative and not restrictive. FIG. 7 shows a block diagram of an exemplary adaptation apparatus 740 for performing frame rate adaptation in a SLAM device, in accordance with another embodiment of the disclosure. In the configuration shown in FIG. 7, the adaptation apparatus 740 includes an operative condition determining module 742, a target frame rate deciding module 744, and a frame rate controlling module 746.

The functions of the operative condition determining module 742 and the target frame rate deciding module 744 are identical to those of the corresponding components of the adaptation apparatus 340 in FIG. 3. Instead of regulating the frame rate of the image sequence transmitted from the camera sensor to the SLAM processor, frame rate adaptation can be implemented by directly altering the sensing rate of the camera sensor. Specifically, the frame rate controlling module 746 receives the target frame rate from the target frame rate deciding module 744, and executes adaptation by regulating the sensing rate of the camera sensor 720 to match the target frame rate.

While both embodiments depicted in FIGS. 3 and 7 use the processed data within the SLAM processor to determine the operative condition of the SLAM device, additionally or alternatively, this determination can be based on data acquired from other sources, such as data sensed by one or more sensors of the SLAM device.

Figure 8:
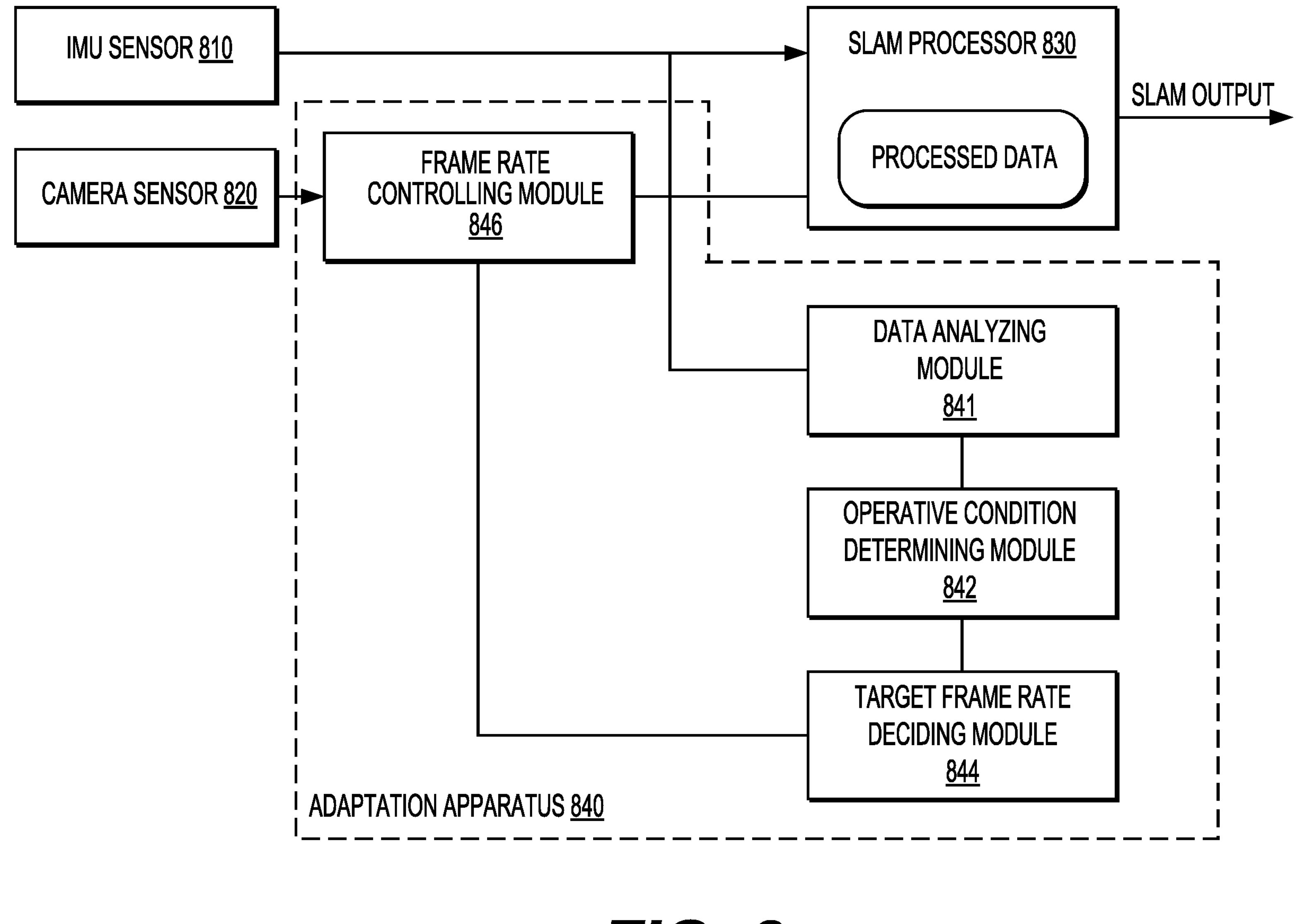
FIG. 8 shows a block diagram of an exemplary adaptation apparatus for performing frame rate adaptation in a SLAM device, in accordance with one embodiment of the disclosure.

FIG. 8 shows a block diagram of an exemplary adaptation apparatus 840 for performing frame rate adaptation in a SLAM device, in accordance with one embodiment of the disclosure. The adaptation apparatus 840 includes a data analyzing module 841, an operative condition determining module 842, a target frame rate deciding module 844, and a frame rate controlling module 846.

The data analyzing module 841 receives and analyzes data from the IMU sensor 810. Based on the data analysis performed by the data analyzing module 841, the operative condition determining module 842 determines the operative condition of the SLAM device. The functions of the target frame rate deciding module 844 and the frame rate controlling module 846 can be identical to those of the corresponding components of the adaptation apparatus 340 shown in FIG. 3.

As described above, in the configuration illustrated in FIG. 8, frame rate adaptation can be achieved by directly adjusting the sensing rate of the camera sensor, rather than regulating the frame rate of the image sequence transmitted from the camera sensor to the SLAM processor.

Figure 9:
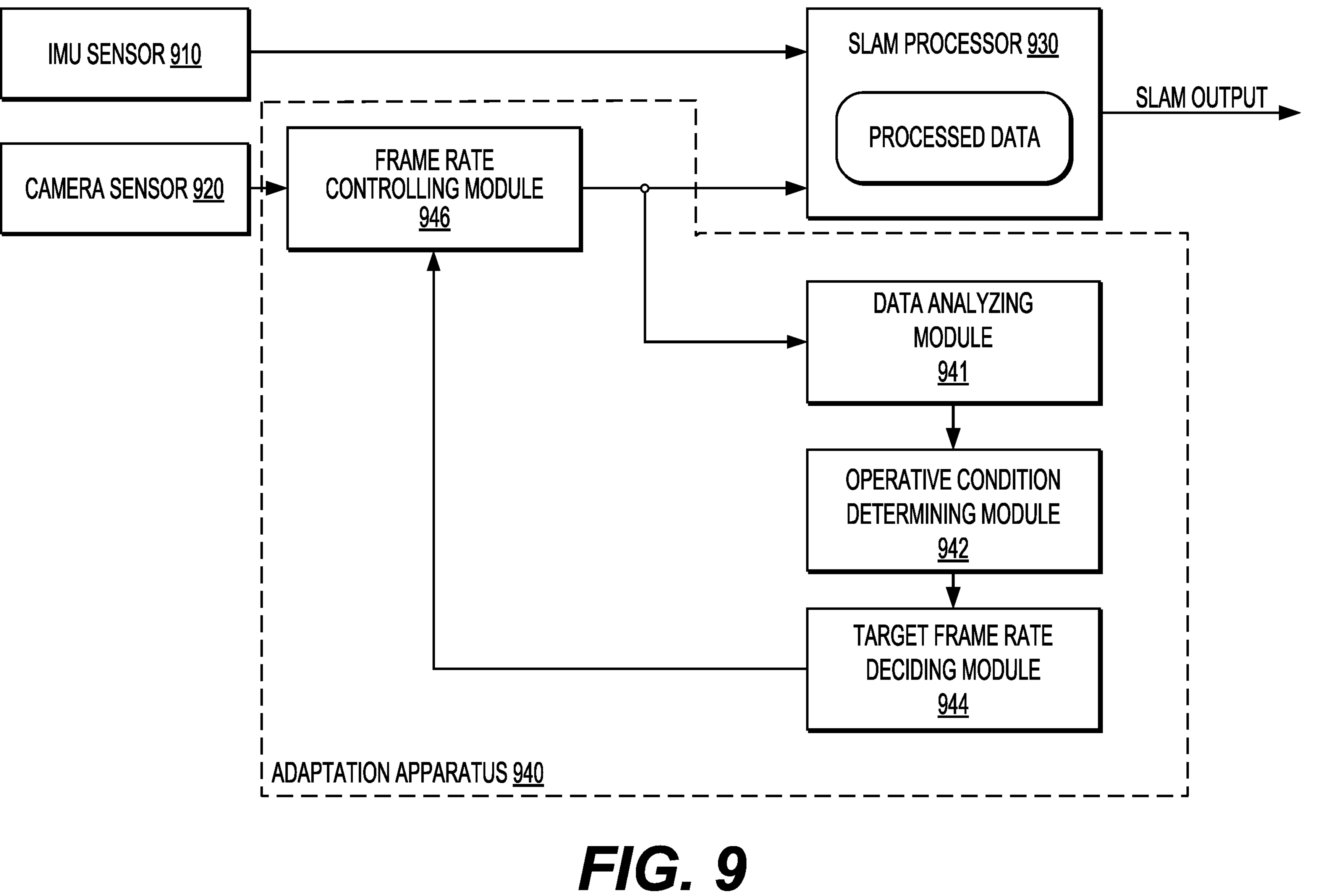
FIG. 9 shows a block diagram of an exemplary adaptation apparatus for performing frame rate adaptation in a SLAM device, in accordance with one embodiment of the disclosure.

The determination of the operative condition can also be based on data acquired from the camera sensor. FIG. 9 shows a block diagram of an exemplary adaptation apparatus 940 for performing frame rate adaptation in a SLAM device, in accordance with one embodiment of the disclosure. The adaptation apparatus 940 includes a data analyzing module 941, an operative condition determining module 942, a target frame rate deciding module 944, and a frame rate controlling module 946.

The data analyzing module 941 receives and analyzes data sensed by the camera sensor 920. Based on the data analysis performed by the data analyzing module 941, the operative condition determining module 942 determines the operative condition of the SLAM device. The functions of the target frame rate deciding module 944 and the frame rate controlling module 946 are same as those of the corresponding components of the adaptation apparatus 340 shown in FIG. 3.

Similarly, in the configuration illustrated in FIG. 9, frame rate adaptation can be achieved by directly adjusting the sensing rate of the camera sensor, rather than regulating the frame rate of the image sequence transmitted from the camera sensor to the SLAM processor.

Figure 10:
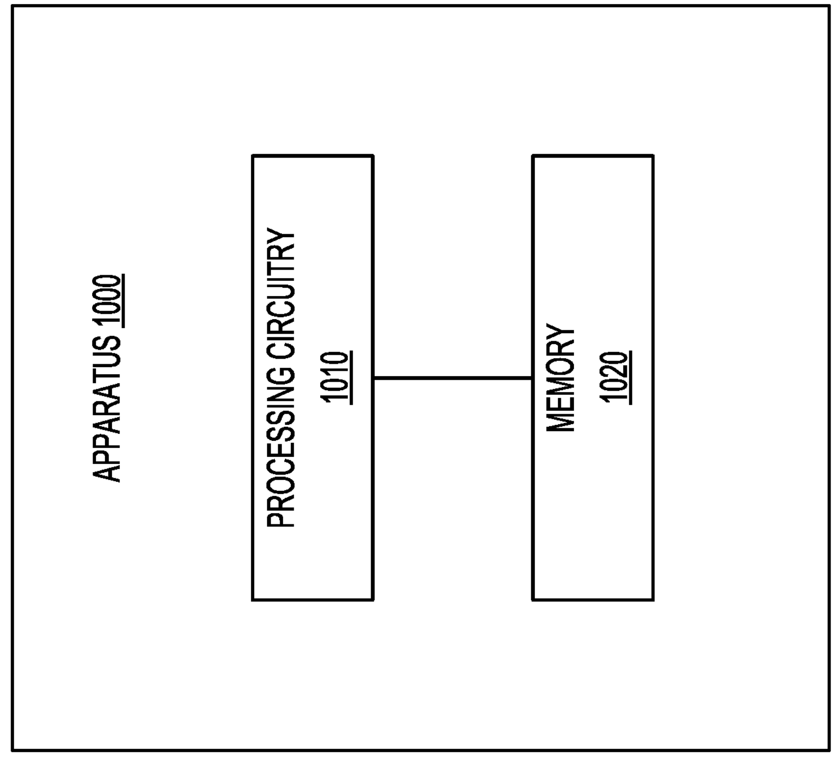
FIG. 10 shows a schematic block diagram of an exemplary apparatus that can incorporate the techniques disclosed herein.

FIG. 10 shows a schematic block diagram of an exemplary apparatus 1000 that can incorporate the techniques disclosed herein. The apparatus 1000 can be configured to perform various functions in accordance with one or more embodiments or examples described herein. Thus, the apparatus 1000 can provide means for implementation of mechanisms, techniques, processes, functions, components, systems described herein.

For example, the apparatus 1000 can be used to implement functions of AI-based feature extractors, non-AI-based feature extractors, key-point detectors, key-point descriptors, KRF modules, AI-based feature extraction modules, add-on frameworks, modules in a V-SLAM system in various embodiments and examples described herein. The apparatus 1000 can include a general-purpose processor or specially designed circuits to implement various functions, components, or processes described herein in various embodiments. The apparatus 1000 can include processing circuitry 1010, and a memory 1020.

In various examples, the processing circuitry 1010 can include circuitry configured to perform the functions and processes described herein in combination with software or without software. In various examples, the processing circuitry 1010 can be a central processing unit (CPU), a graphic process unit (GPU), an accelerated processing unit (APU), a digital signal processor (DSP), an application specific integrated circuit (ASIC), programmable logic devices (PLDs), field programmable gate arrays (FPGAs), digitally enhanced circuits, or comparable device or a combination thereof.

In some other examples, the processing circuitry 1010 can be a central processing unit (CPU) or an accelerated processing unit (APU) configured to execute program instructions to perform various functions and processes described herein. Accordingly, the memory 1020 can be configured to store program instructions. The processing circuitry 1010, when executing the program instructions, can perform the functions and processes. The memory 1020 can further store other programs or data, such as operating systems, application programs, and the like. The memory 1020 can include non-transitory storage media, such as a read only memory (ROM), a random access memory (RAM), a flash memory, a solid state memory, a hard disk drive, an optical disk drive, and the like.

The apparatus 1000 can optionally include other components, such as input and output devices, additional or signal processing circuitry, and the like. Accordingly, the apparatus 1000 may be capable of performing other additional functions, such as executing application programs, image processing algorithms, input or output data, or the like.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid-state memory, magnetic tape, a removable computer diskette, a random-access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for performing frame rate adaptation in a simultaneous localization and mapping (SLAM) device, the SLAM device including a SLAM processor, the method comprising:

acquiring data from the SLAM device;

determining, based on the acquired data, an operative condition of the SLAM device;

deciding, based on the determined operative condition, a target frame rate for the SLAM device; and controlling, based on the decided target frame rate, a frame rate of an image sequence inputted into the SLAM processor.

2. The method of claim 1, wherein the acquiring step further comprises acquiring, as the acquired data, data processed inside the SLAM processor.

3. The method of claim 1, wherein the SLAM device further includes an inertial measurement unit (IMU) sensor, and the acquiring step further comprises:

receiving data outputted from the IMU sensor to the SLAM processor, and analyzing the received data to generate the acquired data.

4. The method of claim 1, wherein the SLAM device further includes a camera sensor, and the acquiring step further comprises:

receiving data outputted from the camera sensor to the SLAM processor, and analyzing the received data to generate the acquired data.

5. The method of claim 1, wherein the SLAM device further includes a camera sensor, the determining step further comprises determining, as the operative condition of the SLAM device, a visual quality of an image sequence captured by the camera sensor, and the visual quality includes at least one of:

richness of texture in the image sequence, a level of auto exposure in the image sequence, an amount of motion blur in the image sequence, a level of noise in the image sequence, resolution of the image sequence, and a frames-per-second of the image sequence.

6. The method of claim 1, wherein the SLAM device further includes a camera sensor, the determining step further comprises determining, as the operative condition of the SLAM device, a utilization scenario of the SLAM device, and the utilization scenario includes at least one of:

a scale of a room where the SLAM device is used, an intensity of movement by a person wearing the SLAM device, a degree of frame drops in the SLAM device, a degree of camera mis-sync of the camera sensor, a number of moving objects in the room, and an intensity of movement by the moving objects.

7. The method of claim 1, wherein the SLAM device further includes a camera sensor, the determining step further comprises determining, as the operative condition of the SLAM device, a camera configuration of the camera sensor, and the camera configuration includes at least one of:

a number of cameras included in the camera sensor, locations of the cameras, fields-of-view of the cameras, and a degree of overlap between the cameras.

8. The method of claim 1, wherein the deciding step further comprises:

upon the determined operative condition meeting a predefined criterion, setting the target frame rate lower than a predefined value.

9. The method of claim 1, wherein the SLAM device further includes a camera sensor, and the controlling step further comprises:

controlling a sensing rate of the camera sensor to the decided target frame rate.

10. The method of claim 1, wherein the SLAM device further includes a camera sensor, and the controlling step further comprises:

regulating, to the decided target frame rate, a frame rate of an image sequence transmitted from the camera sensor to the SLAM processor.

11. An apparatus for performing frame rate adaptation in a simultaneous localization and mapping (SLAM) device, the SLAM device including a SLAM processor, the apparatus comprising processing circuitry configured to:

acquire data from the SLAM device;

determine, based on the acquired data, an operative condition with respect to the SLAM device;

decide, based on the determined operative condition, a target frame rate for the SLAM device; and control, based on the decided target frame rate, a frame rate of an image sequence inputted into the SLAM processor.

12. The apparatus of claim 11, wherein the processing circuitry is further configured to acquire, as the acquired data, data processed inside the SLAM processor.

13. The apparatus of claim 11, wherein the SLAM device further includes an inertial measurement unit (IMU) sensor, and the processing circuitry is further configured to:

receive data outputted from the IMU sensor to the SLAM processor, and analyze the received data to generate the acquired data.

14. The apparatus of claim 11, wherein the SLAM device further includes a camera sensor, and the processing circuitry is further configured to:

receive data outputted from the camera sensor to the SLAM processor, and analyze the received data to generate the acquired data.

15. The apparatus of claim 11, wherein the SLAM device further includes a camera sensor, the processing circuitry is further configured to determine a visual quality of an image sequence captured by the camera sensor as the operative condition of the SLAM device, and the visual quality includes at least one of:

richness of texture in the image sequence, a level of auto exposure in the image sequence, an amount of motion blur in the image sequence, a level of noise in the image sequence, resolution of the image sequence, and a frames-per-second of the image sequence.

16. The apparatus of claim 11, wherein the SLAM device further includes a camera sensor, the processing circuitry is further configured to determine a utilization scenario of the SLAM device as the operative condition of the SLAM device, and the utilization scenario includes at least one of:

a scale of a room where the SLAM device is used, an intensity of movement by a person wearing the SLAM device, a degree of frame drops in the SLAM device, a degree of camera mis-sync of the camera sensor, a number of moving objects in the room, and an intensity of movement by the moving objects.

17. The apparatus of claim 11, wherein the SLAM device further includes a camera sensor, the processing circuitry is further configured to determine a camera configuration of the camera sensor as the operative condition of the SLAM device, and the camera configuration includes at least one of:

a number of cameras included in the camera sensor, locations of the cameras, fields-of-view of the cameras, and a degree of overlap between the cameras.

18. The apparatus of claim 11, wherein the processing circuitry is further configured to:

upon the determined operative condition meeting a predefined criterion, set the target frame rate lower than a predefined value.

19. The apparatus of claim 11, wherein the SLAM device further includes a camera sensor, and the processing circuitry is further configured to:

control a sensing rate of the camera sensor to the decided target frame rate.

20. A non-transitory computer readable medium including computer readable instructions, which when executed by at least one processor, cause the at least one processor to perform a method for performing frame rate adaptation in a simultaneous localization and mapping (SLAM) device, the SLAM device including a SLAM processor, the method comprising:

acquiring data from the SLAM device;

determining, based on the acquired data, an operative condition with respect to the SLAM device;

deciding, based on the determined operative condition, a target frame rate for the SLAM device; and controlling, based on the decided target frame rate, a frame rate of an image sequence inputted into the SLAM processor.

* * * * *